US010473024B2

United States Patent
Eriksson et al.

(10) Patent No.: US 10,473,024 B2
(45) Date of Patent: Nov. 12, 2019

(54) TURBOCOMPOUND UNIT (71) Applicant: VOLVO TRUCK CORPORATION, Gothenburg (SE)

(72) Inventors: Pontus Eriksson, Helsingborg (SE); Kent Giselmo, Vellinge (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 407 days.

(21) Appl. No.: 15/314,041

(22) PCT Filed: May 28, 2014

(86) PCT No.: PCT/EP2014/001443
§ 371 (c)(1),
(2) Date: Nov. 25, 2016

(87) PCT Pub. No.: WO2015/180745
PCT Pub. Date: Dec. 3, 2015

(65) Prior Publication Data
US 2017/0241330 A1    Aug. 24, 2017

(51) Int. Cl.
*F02B 41/10*    (2006.01)
*F02B 37/00*    (2006.01)
(Continued)

(52) U.S. Cl.
CPC ............ *F02B 41/10* (2013.01); *F02B 37/004* (2013.01); *F16D 11/14* (2013.01); *F16D 25/082* (2013.01);
(Continued)

(58) Field of Classification Search
CPC ........ F02B 41/10; F02B 37/004; F16D 67/02; F16D 65/186; F16D 55/40; F16D 41/06;
(Continued)

(56) References Cited

U.S. PATENT DOCUMENTS 2,769,303 A * 11/1956 Lucia ...................... F02B 33/00
                                                      60/608
3,249,189 A *  5/1966 Schjolin ................. F16D 13/72
                                                    192/113.36
(Continued)

FOREIGN PATENT DOCUMENTS

CN       1720391 A    1/2006
EP       2154348 A2   8/2008
WO    2010060856 A1   5/2010

OTHER PUBLICATIONS

International Sear Report (dated Oct. 10, 2014) for corresponding International App. PCT/EP2014/001443.
(Continued)

*Primary Examiner* — Phutthiwat Wongwian
*Assistant Examiner* — Edward Bushard
(74) *Attorney, Agent, or Firm* — Venable LLP; Jeffri A. Kaminski (57) ABSTRACT

A turbocompound unit for converting energy of an exhaust gas from an internal combustion engine to torque increase of a crankshaft of the internal combustion engine includes a turbine arrangement and an arrangement configured to operatively connecting the turbine arrangement to the crankshaft is a hydrodynamic coupling and freewheeling arrangement. The turbocompound unit further includes a brake arrangement, wherein the brake arrangement and the freewheeling arrangement are located on an opposite side of the hydrodynamic coupling in relation to the turbine arrangement.

26 Claims, 8 Drawing Sheets (51) Int. Cl.
*F16D 41/069* (2006.01)
*F16D 11/14* (2006.01)
*F16D 25/08* (2006.01)
*F16D 33/00* (2006.01)
*F16D 41/04* (2006.01)
*F16D 41/06* (2006.01)
*F16D 55/40* (2006.01)
*F16D 65/18* (2006.01)
*F16D 67/02* (2006.01)
*F16D 11/00* (2006.01)
*F16D 121/04* (2012.01)

(52) U.S. Cl.
CPC ............. *F16D 33/00* (2013.01); *F16D 41/04* (2013.01); *F16D 41/06* (2013.01); *F16D 41/069* (2013.01); *F16D 55/40* (2013.01); *F16D 65/186* (2013.01); *F16D 67/02* (2013.01); *F16D 2011/002* (2013.01); *F16D 2121/04* (2013.01); *F16D 2300/06* (2013.01); *Y02T 10/144* (2013.01); *Y02T 10/163* (2013.01)

(58) Field of Classification Search
CPC ........ F16D 11/14; F16D 25/082; F16D 33/00; F16D 41/04; F16D 41/069; F16D 2121/04; F16D 2011/002; F16D 2300/06; Y02T 10/163; Y02T 10/144
USPC .......................... 60/605.1, 624, 614, 74, 475
See application file for complete search history.

(56) References Cited

U.S. PATENT DOCUMENTS

| | | | | |
|---|---|---|---|---|
| 3,951,009 | A * | 4/1976 | Audifferd, Jr. | ......... F15B 11/02 |
| | | | | 74/15.63 |
| 4,953,647 | A * | 9/1990 | Leboime | ................ B62D 11/10 |
| | | | | 180/9.1 |
| 9,534,531 | B2 * | 1/2017 | Benjey | .................. B60K 6/485 |
| 2007/0012037 | A1 | 1/2007 | Kley | |
| 2007/0221463 | A1 | 9/2007 | Kley | |
| 2009/0139231 | A1 | 6/2009 | Eberle et al. | |

OTHER PUBLICATIONS

International Preliminary Report on Patentability (dated Sep. 12, 2016) for corresponding International App, PCT/EP2014/001443.
Chinese Official Action (dated Jul. 2, 2018) for corresponding Chinese App. 201480079319.6.

* cited by examiner

TURBOCOMPOUND UNIT

BACKGROUND AND SUMMARY

The invention relates to a device for converting energy of an exhaust gas to torque input to a crankshaft of an engine, such as an internal combustion engine. More particularly the present invention relates to improvements of the design and control of such turbocompound devices.

The invention can be applied in heavy-duty vehicles, such as trucks, buses and construction equipment. Although the invention will be described with respect to a truck, the invention is not restricted to this particular vehicle, but may also be used in other applications turbocompound devices such as aero or marine systems.

A turbocompound unit is a vehicle component used for recovering a part of the energy of the exhaust gas flow and to convert that energy into a rotational movement of a shaft. The rotational movement of the shaft is transferred as a torque increase to the crankshaft of the engine of the vehicle. Normally, the turbocompound unit has a shaft wherein a turbine wheel is arranged at one distal end. When the internal combustion engine is running exhaust gas will flow into the turbocompound unit and cause the turbine wheel to rotate. Hence, the shaft of the turbocompound unit will rotate accordingly. The opposite end of the shaft is provided with a gear wheel which meshes with additional gears for causing a rotational connection between the shaft and the crankshaft. When the shaft is rotating due to exhaust gas flowing through the turbocompound unit, the rotational energy of the shaft will be transferred to the crankshaft as a torque increase.

The use of turbocompound units has proven to provide significant advantages on driving economics as well as on the environment; the energy recovery from the exhaust gas flow will fact reduce the fuel consumption of the vehicle.

US2009/0139231 describes a turbocompound unit for which the rotational energy of the turbine wheel is transmitted to the crankshaft via a hydrodynamic clutch and a freewheel. The freewheel is integrated into the power transmission path between the turbine and the crankshaft of the engine for disconnecting the turbine form the engine when the turbine speed is lower than the comparable engine speed. The hydrodynamic clutch is provided for reducing rotational oscillations from the crankshaft.

Although the turbocompound unit prevents the turbine from being driven by the engine there is a risk that rotational parts of the turbocompound unit are subjected to overspeed, for example in case of wrong gear shift. Since this may lead to damage and malfunction there is a need for an improved solution allowing for control of the rotational speed of the turbine, not only by allowing the turbine to freewheel.

It is desirable to provide a turbocompound unit overcoming the above mentioned drawbacks of prior art units.

By the provision of a turbocompound unit which comprises brake means, it is possible to control the rotational speed of the critical components of the turbocompound unit, such as the turbine, actively.

According to an embodiment the means configured to operatively connect the turbine arrangement to the crankshaft comprises a gearing. The gearing may comprise at least one gear having teeth for meshing with a corresponding gear of the crankshaft, and wherein the freewheeling means is provided as, a freewheel clutch being arranged radially inside said teeth. Hereby an advantage is provided by the fact that the freewheel clutch does not require additional space, but may be incorporated in already present components of the turbocompound unit.

In an embodiment the brake means comprises a disc clutch. The disc clutch may be provided at one end of a shaft, and the freewheel clutch may be arranged onto the same shaft. This is advantageous in that the shaft may be provided adjacent to the crankshaft such that the freewheel clutch and the brake means are affecting the operation of the majority of the rotating parts of the turbocompound unit.

In one embodiment the freewheel clutch is arranged adjacent to said disc clutch whereby the freewheel clutch and the disc clutch may be subject to service without dismounting the gear.

In another embodiment the freewheel clutch and the disc clutch are arranged at opposite ends of the shaft, whereby space normally available at the turbine side of the shaft may be used for accommodating the disc clutch.

In an embodiment the disc clutch is hydraulically actuated by means of a piston. This is advantageous in that efficient actuation is provided, allowing for rapid response and accurate torque control.

In an embodiment the shaft comprises an oil conduit for providing lubricating fluid to the freewheel clutch and/or the disc package. Hence, the interior space of the shaft may be used for forming a lubrication conduit without requiring additional space.

In an embodiment the freewheeling means and the brake means are provided by means of a clutch having a connection mode for engaging the turbine arrangement with the crankshaft, a freewheeling mode for disconnecting the turbine arrangement from the crankshaft, and a braking mode for braking the turbine arrangement relative the crankshaft. Hence a less complex solution is realized by incorporating, the freewheel and the brake means in a solitary device.

In an embodiment the turbocompound unit further comprises a controller having at least one input for receiving a signal representing the operational status of the turbocompound unit, a determination unit being configured to determine a desired operational status of the turbocompound unit and to calculate a corresponding control signal, and at least one output for transmitting the control signal to the brake means and/or to the freewheeling means. It is thus possible to actively control the operation of the turbocompound unit for optimal performance.

In an embodiment the input of the controller is configured to receive a signal representing, the engine torque and the engine speed of the associated internal combustion engine, and wherein the determination unit is configured to determine a risk of oil leakage in the turbine arrangement. Such embodiment is advantageous in that it could remove the need for a buffer air system which otherwise is necessary in order to prevent oil leakage into the exhaust gas path of the turbocompound unit.

In an embodiment the input of the controller is configured to receive a signal representing the rotational speed of the turbine arrangement, and wherein the determination unit is configured to determine a risk of malfunction due to engine overspeed. This is advantageous in that brake means may be activated for preventing malfunction.

In an embodiment the input of the controller is configured to receive a signal representing the current driving mode, and the determination unit is configured to determine a risk of excessive friction of the turbocompound unit, i.e. when net output torque from the turbocompound unit to the engine is zero or below zero.

In another embodiment the input of the controller is configured to receive a signal representing start-up of the internal combustion engine, and wherein the determination unit is configured to determine a risk of excessive load on an associated starter.

Further advantages and advantageous features of the invention are disclosed in the following description and in the dependent claims.

The invention also relates to an internal combustion engine system comprising an internal combustion engine having a crankshaft and a turbocompound unit, as well as to a vehicle comprising a turbocompound unit.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
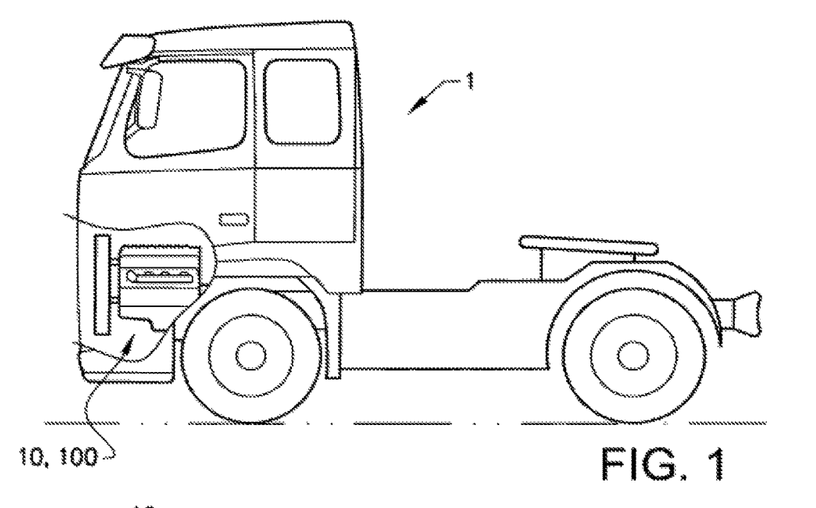
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a turbocompound unit 100 according to various embodiments. The vehicle 1 may have additional propulsion units, such as electric drives etc, as long as it has at least one engine providing a flow of exhaust gases interacting with the turbocompound unit 100. Hence the vehicle 1 is not exclusively a truck but may also represent various heavy duty vehicles such as buses, constructional equipment, etc.

Figure 2:
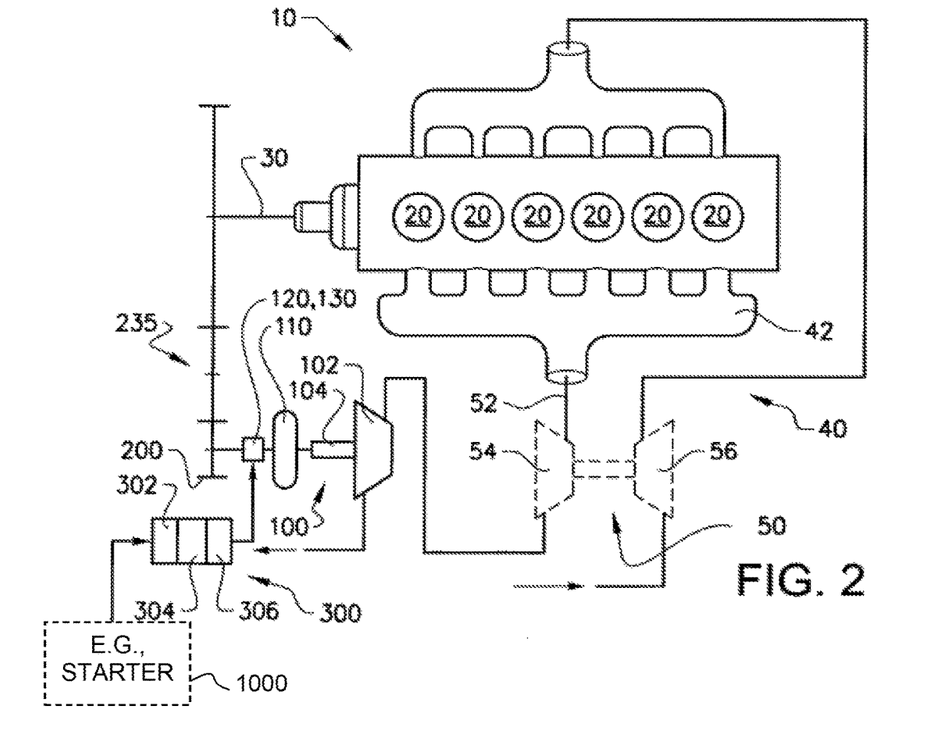
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters a manifold 42 which is further connected to an inlet 52 of a turbo charger 50. The exhaust gas flow causes a turbine wheel 54 to rotate, which rotation is translated to a corresponding rotation of a compressor wheel 56 being used to compress incoming air before it is introduced in the cylinders 20. The structural as well as functional specifications of a turbocharger 50 are well known in the art and will not be described in further details.

The exhaust gas exits the turbocharger 50 and flows to a turbocompound unit 100, optionally via an exhaust gas pressure regulator (not shown). The incoming exhaust gas, from which some energy have already been used to drive the turbine wheel 54 of the turbo charger 50, is guided to pass a turbine wheel 102 of the turbocompound unit 100, thus causing the turbine wheel 102 and an associated turbine shaft 104 to rotate. The rotation of the turbine shaft 104 is transmitted to a corresponding rotation of a gear wheel 200 via a hydrodynamic coupling 110 and a freewheel 120 and brake means 130. The freewheel 120 and/or the brake means 130 is connected to a control unit 300 for performing methods in order to control the operation of the freewheel 120 and/or brake means 130. The gear wheel 200 meshes with further gearings 205 in order to couple the turbine shaft 104 to the crankshaft 30. Hence, when the turbine wheel 02 is forced to rotate the turbine shaft 104 will provide an additional torque to the crankshaft 30.

Figure 3:
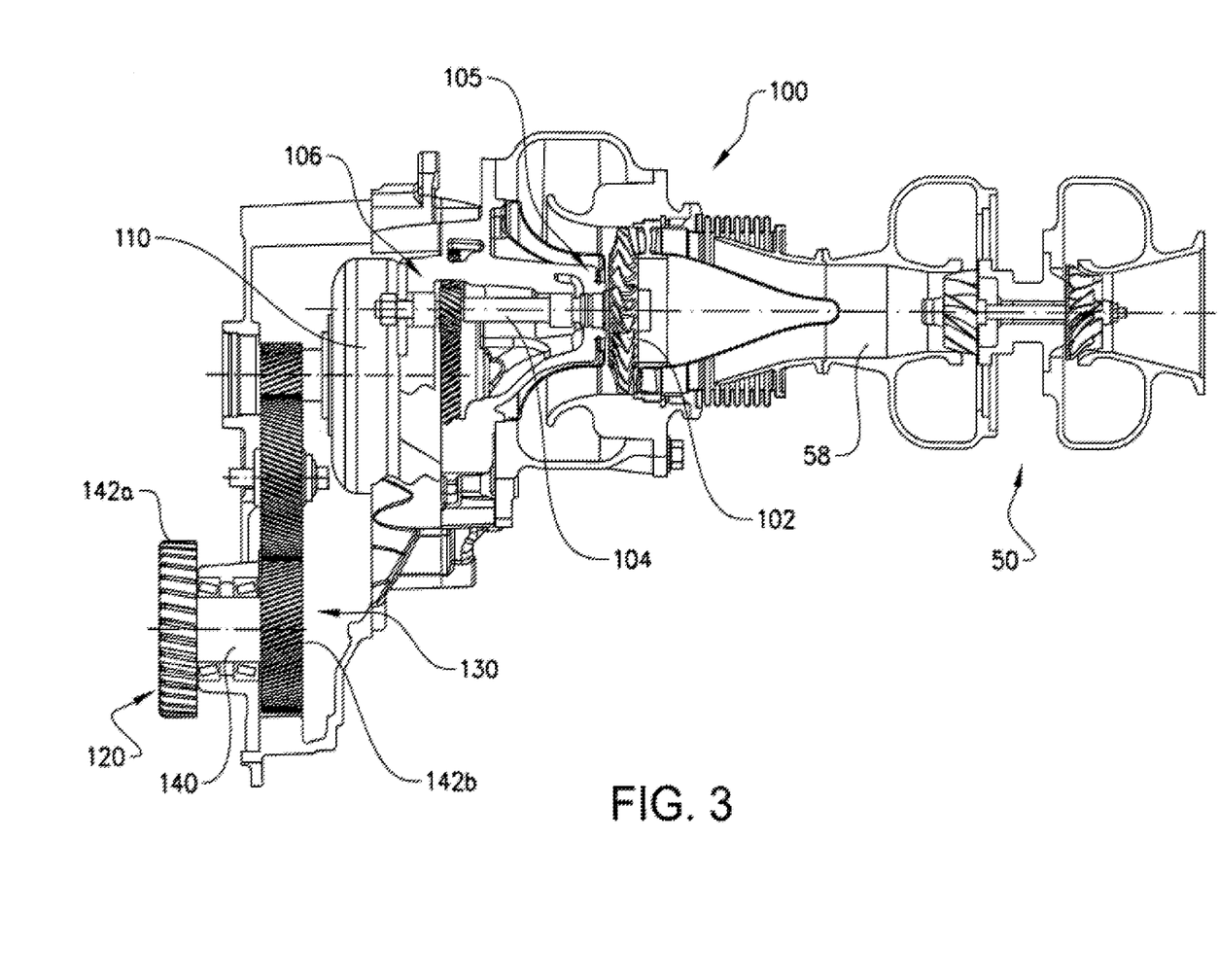
FIG. 3 is a cross-sectional view of a turbocompound unit according to an embodiment.

An embodiment of a turbocompound unit is shown in further details in FIG. 3. The turbocompound unit 100 is arranged in series with a turbo charger 50, although other embodiments of a turbocompound unit 100 do not include such provision of the turbo charger 50.

Exhaust gas leaving an outlet 58 of the turbo charger 50 is directed to an axial-flow or radial in-flow (not shown) turbine wheel 102 of the turbocompound unit 100, whereby the turbine wheel 102 starts to rotate. The rotation of the turbine wheel 102 is transmitted to the turbine shaft 104, whereby the turbine wheel 102 and the turbine shaft 104 forms a turbine arrangement 105. Reduction gearings 106 are provided for adjusting the rotational speed of the turbine arrangement 105 such that it corresponds with the rotational speed of the crankshaft 30, i.e. the speed of the internal combustion engine 10. Hence the reduction gearings 106 forms at least part of means configured to operatively connecting the turbine arrangement 05 to the crankshaft 30.

The hydrodynamic clutch 110 is provided in order to reduce torque pulsations from the crankshaft 30. The turbine arrangement 105 is arranged on a primary side, i.e. a side which is normally associated with torque input of the hydrodynamic clutch 110, while the freewheel 120 and the brake means 130 are provided on a secondary side, i.e. a side which is normally associated with torque output.

As is indicated in FIG. 3 the freewheel 120 and the brake means 130 are provided on a common shaft 140 which forms part of the reduction gearings 106. In fact the shaft 140 may be provided with two gears 142a, 142b at opposite ends, whereby one gear 142a is connecting with the crankshaft 30 while the other gear 142*b* is connecting with the secondary side of the hydrodynamic clutch 10.

Figure 4:
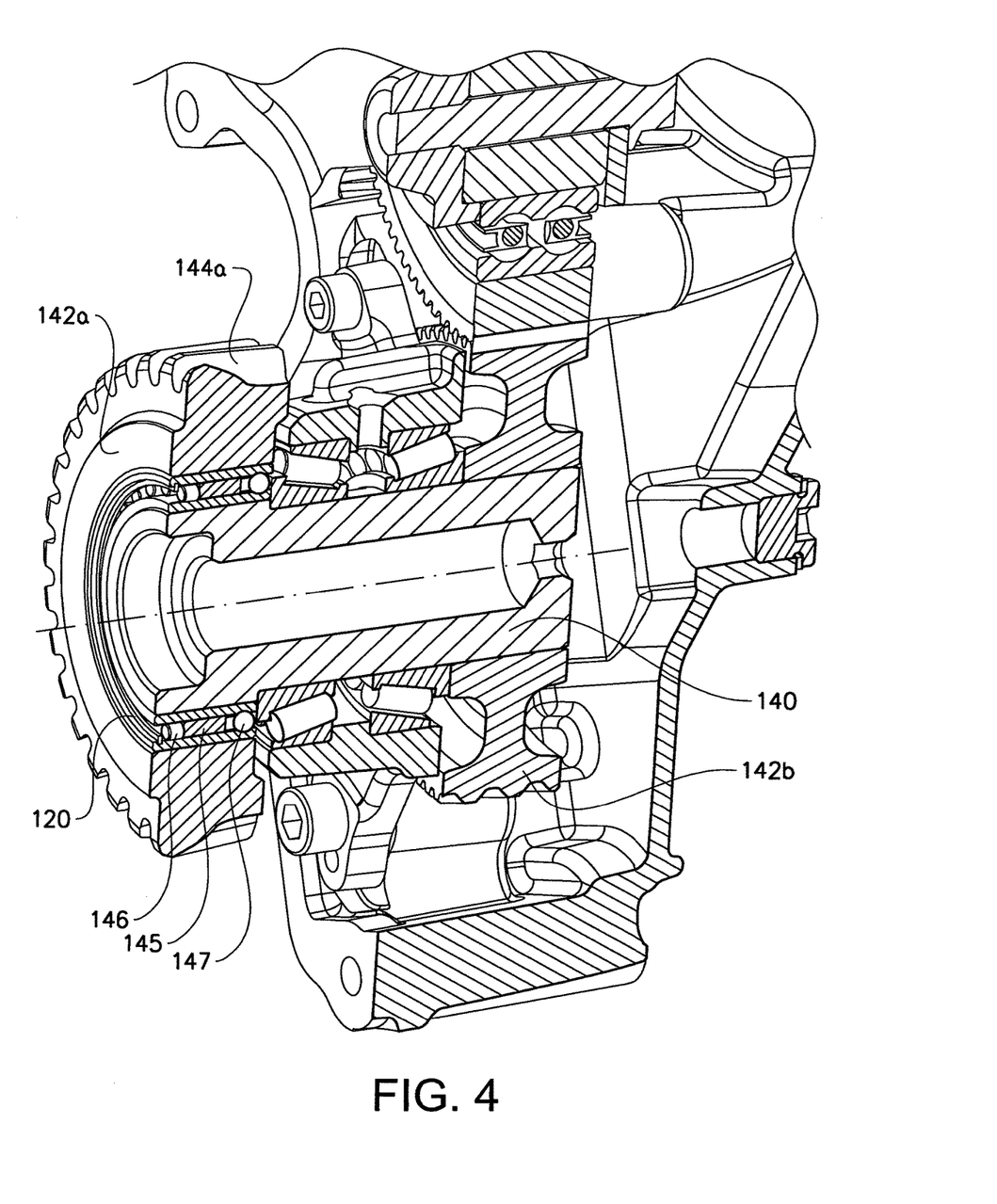
FIG. 4 is an isometric cross-sectional view of a freewheel of a turbocompound unit according to an embodiment.

The shaft 140 having two gears 142*a*, 142*b* spaced apart axially is normally called a bull gear. A bull gear according to an embodiment is shown is FIG. 4. A shaft 140 is provided with a first gear 142*a* having teeth 144*a* for meshing with corresponding teeth of an adjacent gear of the crankshaft 30. A second gear 142*b* is provided at an opposite end for connecting the bull gear with the output side, i.e. the secondary side, of the hydrodynamic coupling 110. The freewheel 120 is provided as a freewheel clutch being arranged radially inside said teeth 144*a*. The freewheel clutch is preferably constructed such that it is transmitting, or supporting torque in one direction by friction and allowing idling in the opposite direction. This is accomplished by arranging a plurality of sprags 145 between a roller bearing 146 and a ball bearing 147. Hence the shaft will always drive the gear 142*a*, while the gear 142*a* will never drive the shaft 140.

Figure 5:
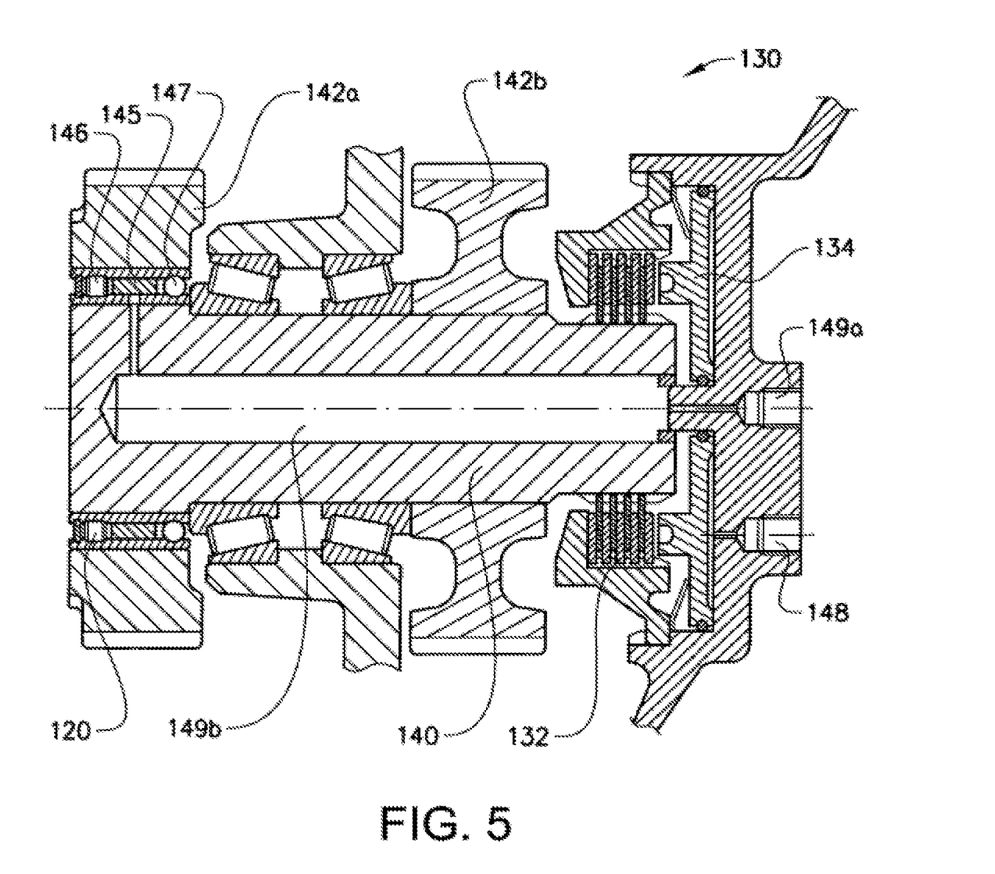
FIG. 5 is a cross-sectional view of a freewheel and brake means of a turbocompound unit according to an embodiment.

The bull gear is further shown in FIG. 5, in which the shall 140 is provided with brake means 130. The brake means 130 is thus arranged on the secondary side of the hydrodynamic coupling 110, i.e. on an opposite side relative the turbine arrangement 105. The brake means 130 comprises a disc package 132 and a piston 134 which is configured to compress the disc package 132 upon hydraulic activation. A first series of discs are fixedly attached to the shaft 140, while a second series of discs are fixedly attached to an adjacent housing. When the disc package 132 is compressed the shaft 140 will be restricted from rotating relative the housing. For this purpose the shaft 140 comprises a pressure inlet 148 for supplying hydraulic fluid to the brake means 130. Further to this an oil inlet 149*a* is provided and being connected to an oil conduit 149*b* for providing lubricating fluid to the freewheel clutch. Preferably the inlets 148, 149*a* are arranged at an axial end of the shaft 140.

The turbocompound unit 100 described so far may provide improved operation as well as reduced complexity of the constructional design. It is well known that during specific operating conditions the pressure behind the turbine wheel may drop causing a suction pressure from the turbocompound housing, i.e. from the parts supporting the turbine shaft. Since this suction pressure may draw oil and other lubrication fluids into the exhaust gas flow it is desirable to always maintain an overpressure behind the turbine. Existing solutions to this problem include the pre vision of buffer air, which means that pressurized air is supplied to an area between the housing and the turbine wheel.

Figure 6:
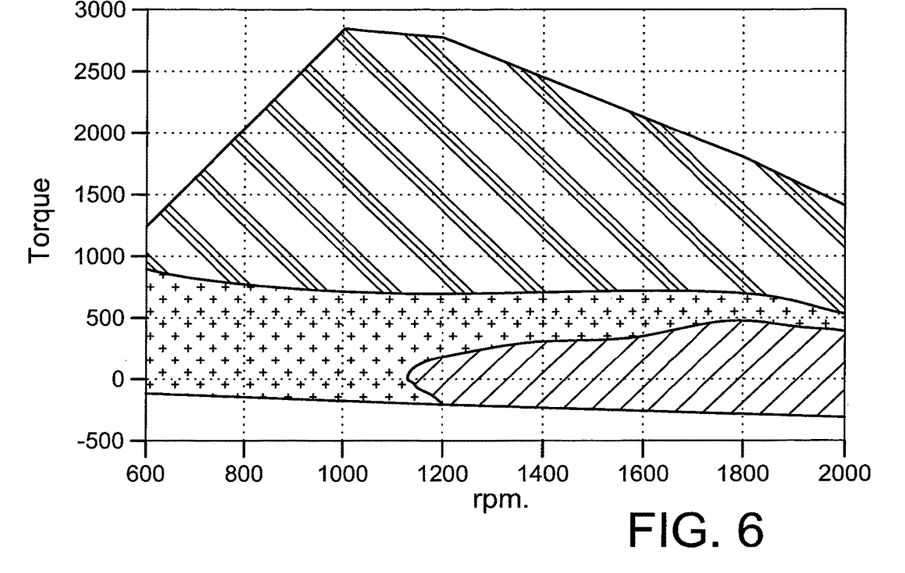
FIG. 6 is a diagram showing the pressure behind the turbine as a function of the torque bit an internal combustion engine and the speed of the internal combustion engine with coupled turbine.

The turbocompound unit according to the present application may solve this problem in a different manner. A diagram showing the pressure behind the turbine wheel as a function of engine speed and engine torque is shown in FIG. 6. The dashed area, corresponding to a relative high engine speed at relatively low engine torque, is critical with respect to the pressure behind the turbine wheel of the turbocompound unit. Hence, oil leakage is most likely to happen at operating conditions corresponding to the shaded area.

Figure 7:
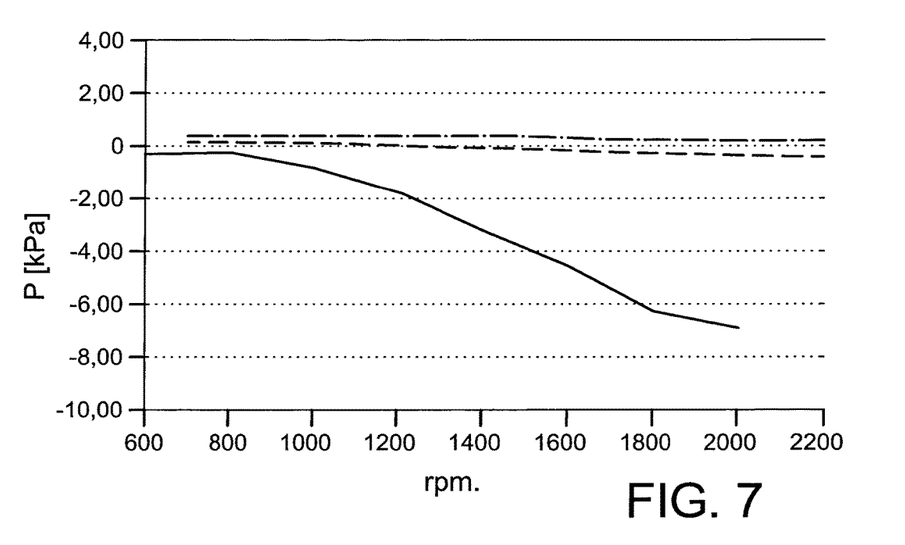
FIG. 7 is a diagram showing the pressure behind the turbine of a turbocompound unit versus the speed of the internal combustion engine for a given engine load.

FIG. 7 shows another diagram, in which the pressure behind the turbine is plotted as a function of engine speed by a solid line. However, the diagram also shows the pressure behind the turbine if the turbocompound unit could control either the freewheeling means 120, or the brake means 130 (dashed lines). It is clear that braking or freewheeling will maintain a high pressure behind the turbine thus preventing oil to escape into the exhaust gas flow. The turbocompound unit may for this purpose comprise the controller 300, which in FIG. 1 is shown to have at least one input 302 for receiving a signal representing the 5 operational status of the turbocompound unit 100, a determination unit 304 being configured to determine a desired operational status of the turbocompound unit 100 and to calculate a corresponding control signal, and at least one output 306 for transmitting the control signal to the brake means 130 and/or the freewheel means 120. From FIGS. 6 and 7 it is evident that by monitoring the operational status of the turbocompound unit 10 100, e.g. as in this case by monitoring the operational status of the associated internal combustion engine, it is possible to control the freewheeling means 120 and/or the braking means 130 for allowing the turbocompound unit 100 to operate its an optimum manner.

The above example of controlling the turbocompound unit is realized by the controller 300 acting as a control unit, and having at least one input 302 for receiving a signal representing the operational status of the turbocompound unit 100, a determination unit 304 being configured to determine a risk associated with the operational status and to determine a corresponding control signal, and at least one output 306 for transmitting the control signal to the brake means 130 and/or the freewheeling means 120.

In the embodiment described with reference to FIGS. 6 and 7 the input 302 of the controller 300 is configured to receive a signal representing the engine torque and the engine speed of the associated internal combustion engine 10, and the determination unit 304 is configured to determine a risk of oil leakage.

In another embodiment the input 302 of the controller 300 is configured to receive a signal representing the rotational speed of the turbine arrangement 105. The determination unit 304 may in such embodiment be pre-programmed to assess the risk of overspeed, which may lead to serious damage of the turbine wheel 102. Should there be a risk for engine overspeed the control unit 300 may transmit an output signal for braking the turbine arrangement 105. Such embodiment is particularly advantageous by the fact that the turbocompound unit 100 may be designed closer to its limits, as the controlling functionality will prevent damage and malfunction.

In a yet further embodiment the input 302 of the controller 300 is configured to receive a signal representing the current driving mode, and the determination unit 304 is configured to determine a risk when net output torque from the turbocompound unit to the engine is zero or below zero. During operation some situations may occur in which the engine 10 is having a higher speed than the turbocompound unit 100. Normally this will have a negative effect on the fuel consumption since the engine 10 must also drive the turbocompound unit 100. However, the controller 300 may determine that there is a risk for torque transfer in the wrong direction, i.e. from the engine 1 to the turbocompound unit 100, and brake or freewheel the turbocompound unit 100 accordingly.

In a further embodiment the input 302 of the controller 300 is configured to receive a signal representing start-up of the internal combustion engine 10. In order to minimize the rotating masses upon startup, the determination unit 304 may determine a risk of excessive load on an associated starter (shown schematically in FIG. 2), and the controller 300 may output a signal for freewheeling the turbocompound unit 100.

In a still further embodiment the input 302 of the controller 300 is configured to receive a signal representing the status of an associated exhaust gas aftertreatment system. The determination unit 304 may be pre-programmed to determine a risk of non-optimal energy usage, which e.g. may indicate that the heat of the exhaust gas flow may be better used in the aftertreatment system than in the turbocompound unit 100. Hence, the controller 300 may output a signal for freewheeling and/or braking the turbocompound unit 100.

In one embodiment the input 302 of the controller 300 is configured to receive a signal representing the temperature of the exhaust gas. The determination unit 304 is configured to determine a risk of unfavorable operation of an associated exhaust gas aftertreatment system. Hence, should the temperature of the exhaust gas flowing into the turbocompound unit not be sufficient to allow optimal operation of the associated aftertreatment system the controller 300 may command freewheeling of the turbocompound unit.

In a yet further embodiment the input 302 of the controller 300 is configured to receive a signal representing engine braking, and the determination unit 304 is configured to determine a risk of undesired torque transfer from the turbocompound unit to the crankshaft.

Figure 8:
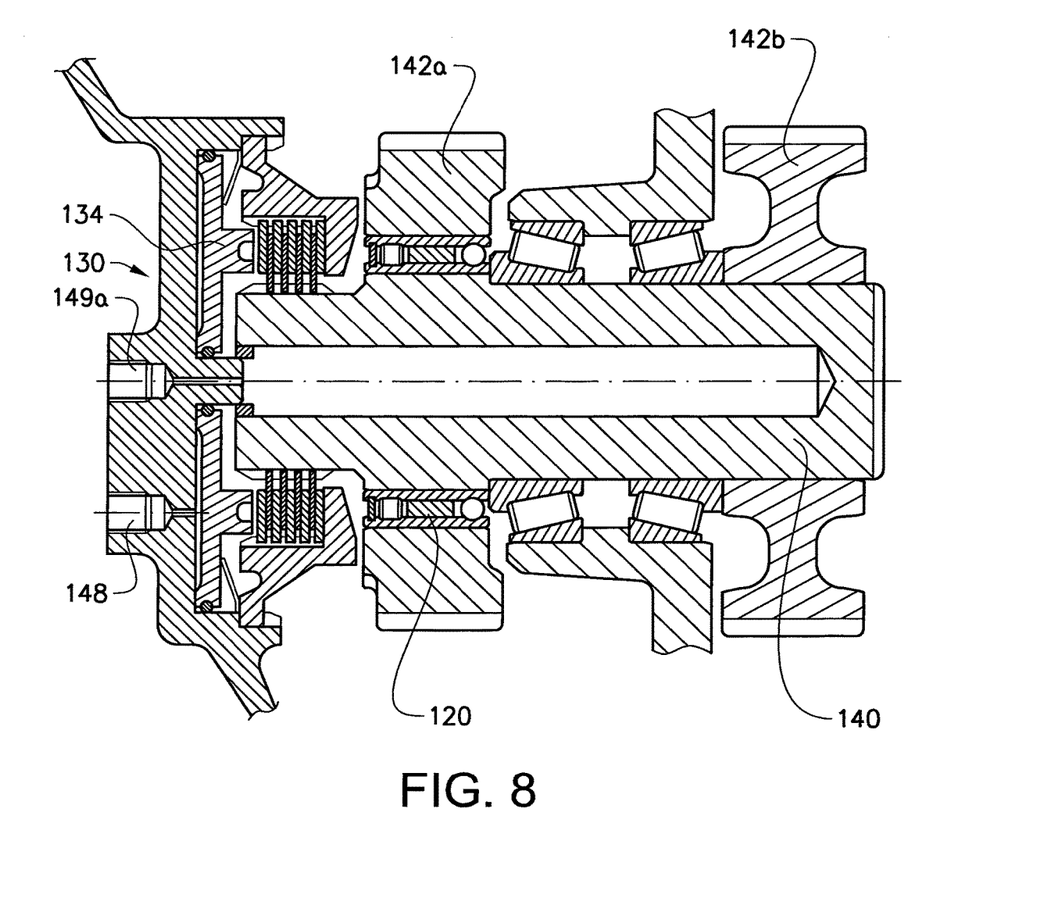
FIG. 8 is a cross-sectional view of a freewheel and brake means of a turbocompound unit according to a further embodiment.

In FIG. 8 an embodiment of a brake means 130 and a freewheeling means 120 is shown. The particular embodiment is advantageous by the fact that service may be provided more easily without the need for dismounting the bull gear from the turbocompound unit. The bull gear is similar to what is shown in FIG. 5, however the brake means 130, i.e. the hydraulically actuated coupling 130, is arranged on the opposite side of the freewheel clutch 120.

Figure 9:
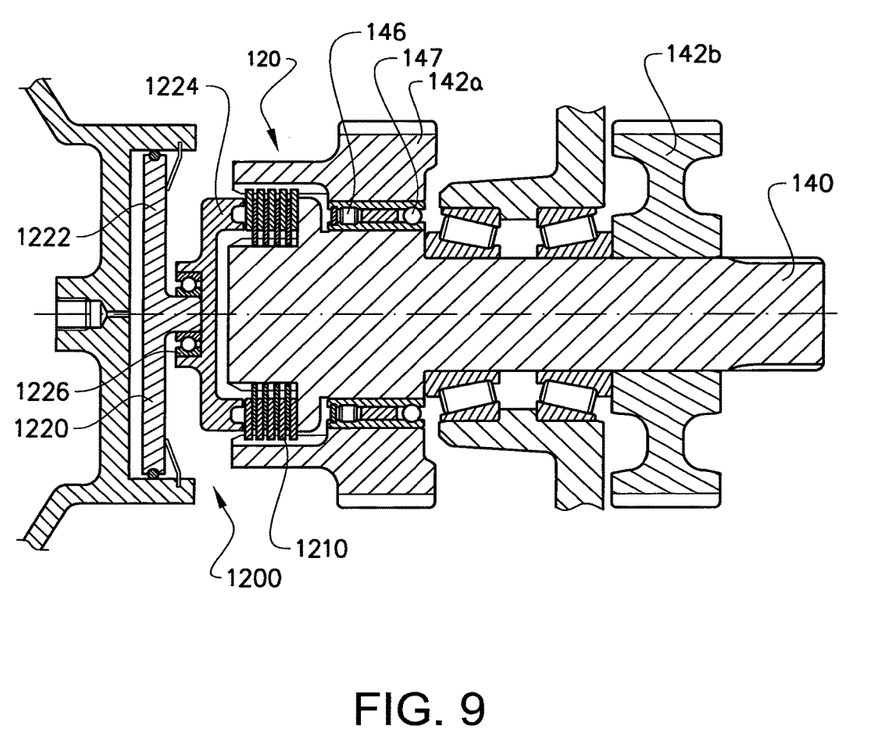
FIG. 9 is a cross-sectional view of a freewheel means of a turbocompound unit according to an embodiment.

In FIG. 9 a further embodiment of a freewheeling means 120 is shown. In this embodiment the freewheel functionality is controllable. Similarly to what has been described with reference to FIGS. 4 and 5 the freewheel means 120 is formed by means of the gear 142*a* being supported on the shaft 140 via a bearing 146, 147. However, in this embodiment there are no sprags which means that the gear 142*a* is free to rotate relative the shaft 140. Freewheel control is achieved by means of a freewheel coupling 1200, which upon actuation will connect the gear 142*a* with the shaft 140 such that rotation of the gear 142*a* or the shaft 140 is transmitted to the other one of the gear 142*a* or the shaft 140.

The freewheel coupling 1200 comprises a disc package 1210 having a first set of discs 0 being fixedly connected to the shaft 140, and a second set of discs being fixedly connected to the gear 142*a*. A spring biased hydraulic piston 1220 may urge the first set of discs and the second set of discs towards each other such that there will be no, or very little, slip between the first and second set of discs. For synchronization purposes the piston 1220 may comprise a non-rotating part 1222 and a rotating part 1224; the rotating 5 part 1224 being allowed to rotate with the gear 142*a* or the shaft 140. The rotating part 1224 is arranged on the non-rotating part 1222 via a bearing 1226. It should be realized that the freewheel means 120 in the form of a coupling 1200 may be combined with a brake means 130, e.g. in accordance with the embodiment being described with reference to FIG. 5. One end of the shaft 140 may thus be provided with a freewheel coupling 1200, while the opposite end of the shaft 140 may be provided with the brake means 130.

Figure 10:
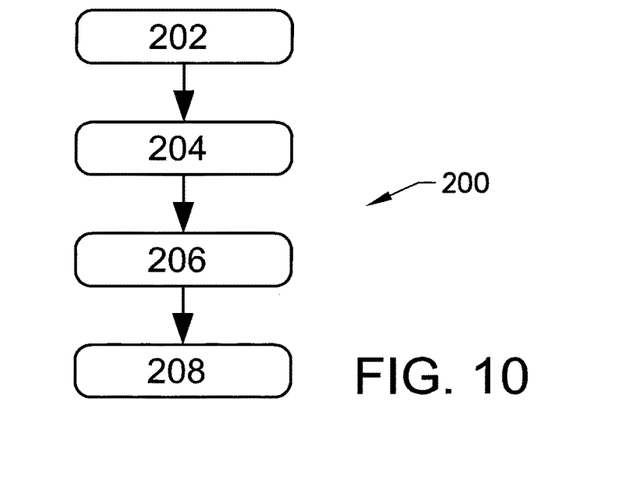
FIG. 10 is a schematic view of a method according to an embodiment.

Now turning to FIG. 10 a method 200 for controlling the operation of a turbocompound unit is schematically shown. The method 200 includes a first step 202 of receiving a signal representing the operational status of the internal combustion engine 10 or the turbocompound unit 100. As described previously the signal may e.g. be a signal representing the engine torque and the engine speed of the associated internal combustion engine, a signal representing the rotational speed of the turbine arrangement, a signal representing the current driving mode, or a signal representing start-up of the internal combustion engine.

In a subsequent step 204 the method determines a risk associated with the operational status, such as a risk of oil leakage in the turbine arrangement, a risk of malfunction due to overspeed, a risk of excessive friction of the turbine arrangement, or a risk of excessive load on an associated starter, in accordance with the description above.

The method thereafter performs a step 206 in which a control signal is generated, wherein the control signal is configured in accordance with the determined risk.

The method 200 also comprises the step 208 of outputting and transmitting the control signal to the freewheeling means 120 and/or to the brake means 130 of the turbocompound unit 100 for controlling the operation of the turbocompound unit 100.

The embodiments described so far may require active control of the brake means 130 and/or freewheeling means 120. In FIGS. 5 and 8 the brake means 130 may be controlled by providing hydraulic fluid for actuating the piston, however the freewheel 120 is a passive component. An active freewheel, i.e. a controllable freewheel, is shown in FIG. 9. Should it be desired to provide a freewheeling means which is controllable, the freewheeling means 120 and the brake means 130 may be provided by means of a clutch having a connection mode for engaging the turbine arrangement 105 with the crankshaft 30, a freewheeling mode for disconnecting the turbine arrangement 105 from the crankshaft 30, and a braking mode for braking the turbine arrangement 105 relative the crankshaft 30. The freewheeling mode may e.g. be realized by arranging a controllable coupling between the two gears 142*a*, 142*b* of the bull gear.

Figure 11:
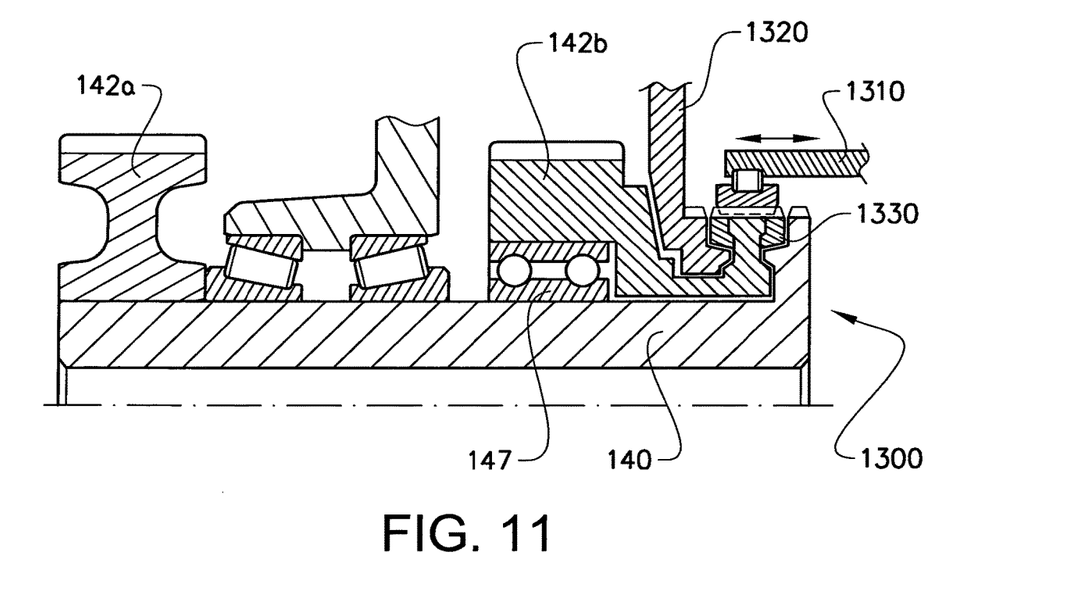
FIG. 11 is a cross-sectional view of a freewheel means and brake means of a turbocompound unit according to an embodiment.

An embodiment of such clutch 1300 is shown in FIG. 11. The clutch 1300 comprises a first gear 142*a* being configured to connect to a crankshaft, and a second gear 142*b* being configured to connect to the output of the hydrodynamic coupling 110 (see FIG. 3). The first gear 142*a* is supported directly onto a shaft 140, e.g. via a press fit, while the second gear 142*b* is supported onto the shaft 140 via a ball bearing 147. The clutch 1300 further comprises an actuator 1310 which is moveable between a neutral mode, corresponding to a freewheel mode, and either an engaging mode in which the gear 142*a* is rotationally connected to the gear 142*b*, or a brake mode in which the gear 142*b* is connected to a stationary housing 1320. FIG. 11 shows the actuator 1310 in neutral position, i.e. the gear 142*b* is freewheeling relative the shaft 140. Should the actuator 1310 be controlled to move left in the figure, the actuator will connect the gear 142*b* with the housing 1320 such that the gear 142*b* will be prevented from rotating. Should the actuator instead be controlled to move right in the figure from its neutral position, the actuator will connect the gear 142*b* with the shaft 140 such that the gear 142*b* will rotate with the shaft 140. Synchronization rings 1330 may be provided in order to synchronize the speed of the two sides before engagement.

In a preferred embodiment the turbocompound unit 100 may further comprise an elastic element being arranged somewhere between the crankshaft and the turbine arrangement 105. Such elastic element, e.g. in the form of springs incorporated in the disc coupling of the brake means 130 and/or the freewheeling means 120, will thus isolate the hydrodynamic coupling 110, and consequently also the turbine arrangement 105 from torque pulsations coming from the engine.

According to further aspects of the invention, a computer comprising a computer program for performing the steps of the method described herein when the program is run on the computer, a non-transitory computer readable medium carrying a computer program for performing the steps of the method described herein when the program product is run on a computer, and a control unit for controlling the operation of a turbocompound unit, the control unit being configured to perform the steps of the method described herein are provided.

It is to be understood that the present invention is not limited to the embodiments described above and illustrated in the drawings; rather, the skilled person will recognize that many changes and modifications may be made within the scope of the appended claims.

The invention claimed is:

1. A turbocompound unit for converting energy of an exhaust gas from an internal combustion engine to torque increase of a crankshaft of the internal combustion engine, comprising
a turbine arrangement,
means configured to operatively connecting the turbine arrangement to the crankshaft via a hydrodynamic coupling and freewheeling means,
brake means, the brake means and the freewheeling means being located on an opposite side of the hydrodynamic coupling in relation to the turbine arrangement.

2. The turbocompound unit according to claim 1, wherein the means configured to operatively connect the turbine arrangement to the crankshaft comprises a gearing.

3. The turbocompound, unit according to claim 2, wherein the gearing comprises at least one gear having teeth for meshing with a corresponding gear of the crankshaft, and wherein the freewheeling means is provided as a freewheel clutch being arranged radially inside the teeth.

4. The turbocompound unit according to claim 1, wherein the brake means comprises a disc clutch.

5. The turbocompound unit according to claim 3, wherein the brake means comprises a disc clutch, and wherein the disc clutch is provided at one end of a shaft, and wherein the freewheel clutch is arranged onto the shaft.

6. The turbocompound unit according to claim 5, wherein the freewheel clutch is arranged adjacent to the disc clutch.

7. The turbocompound unit according to claim 5, wherein the freewheel clutch and the disc clutch are arranged at opposite ends of the shaft.

8. The turbocompound unit according to claim 4, wherein the disc clutch is hydraulically actuated by means of a piston.

9. The turbocompound unit according to claim 5, wherein the shaft comprises an oil conduit for providing lubricating fluid to the freewheel clutch and or the friction discs.

10. The turbocompound unit according to claim 1, wherein the freewheeling means and the brake means are provided by means of a clutch having a connection mode for engaging the turbine arrangement with the crankshaft, a freewheeling mode for disconnecting the turbine arrangement from the crankshaft, and a braking mode for braking the turbine arrangement relative the crankshaft.

11. The turbocompound unit according to claim 1, further comprising a controller having at least one input for receiving a signal representing the operational status of the turbocompound unit, a determination unit being configured to determine a desired operational status of the turbocompound unit and to calculate a corresponding control signal, and at least one output for transmitting the control signal to the brake means and/or the freewheeling means.

12. A turbocompound unit for converting energy of an exhaust gas from an internal combustion engine to torque increase of a crankshaft of the internal combustion engine, comprising
a turbine arrangement,
means configured to operatively connecting the turbine arrangement to the crankshaft via a hydrodynamic coupling,
freewheeling means,
brake means, and
a controller having at least one input for receiving a signal representing the operational status of the turbocompound unit, wherein the input of the controller is configured to receive a signal representing the engine torque and the engine speed of the associated internal combustion engine, a determination unit being configured to determine a risk of oil leakage in the turbine arrangement being associated with the operational status and to determine a corresponding control signal, and at least one output for transmitting the control signal to the brake means and/or the freewheeling means for controlling the rotational speed of the turbine arrangement of the turbocompound unit.

13. The turbocompound unit according to claim 12, wherein the input of the controller is further configured to receive a signal representing the rotational speed of the turbine arrangement, and wherein the determination unit is configured to determine a risk of malfunction due to overspeed.

14. The turbocompound unit according to claim 12, wherein the input of the controller is further configured to receive a signal representing the current driving mode, and wherein the determination unit is configured to determine a risk of excessive friction of the turbocompound unit.

15. The turbocompound unit according to claim 12, wherein the input of the controller is further configured to receive a signal representing start-up of the internal combustion engine, and wherein the determination unit is configured to determine a risk of excessive load on an associated starter.

16. The turbocompound unit according to claim 12, wherein the input of the controller is further configured to receive a signal representing the temperature of the exhaust gas, and wherein the determination unit is configured to determine a risk of unfavorable operation of an associated exhaust gas aftertreatment system.

17. The turbocompound unit according to claim 12, wherein the input of the controller is further configured to receive a signal representing engine braking, and wherein the determination unit is configured to determine a risk of undesired torque transfer from the turbocompound unit to the crankshaft.

18. An internal combustion engine system, comprising an internal combustion engine having a crankshaft and a turbocompound unit according to claim 1.

19. A vehicle comprising a turbocompound unit according to claim 1.

20. A method for controlling the operation of a turbocompound unit configured to convert energy of an exhaust gas from an internal combustion engine to torque increase of a crankshaft of the internal combustion engine, the turbocompound unit comprising a turbine arrangement and means configured to operatively connecting the turbine arrangement to a crankshaft of the internal combustion engine via a hydrodynamic coupling, brake means, and freewheeling means, comprising:

receiving a signal representing the operational status of the turbocompound unit by receiving a signal representing the engine torque and the engine speed of the associated internal combustion engine, determining a risk of oil leakage in the turbine arrangement being associated with the operational status, determining a corresponding control signal, and transmitting the control signal to the freewheeling means and/or to the brake means of the turbocompound unit for controlling the operation of the turbocompound unit by controlling the rotational speed of the turbine arrangement of the turbocompound unit.

21. The method according to claim 20, wherein the step of receiving a signal representing the operational status further comprises receiving a signal representing the rotational speed of the turbine arrangement, and wherein the step of determining a risk comprises determining a risk of malfunction due to overspeed.

22. The method according to claim 20, wherein the step of receiving a signal representing the operational status further comprises receiving a signal representing the current driving mode, and wherein the step of determining a risk comprises determining a risk of excessive friction of the turbine arrangement.

23. The method according to claim 20, wherein the step of receiving a signal representing the operational status further comprises receiving a signal representing start-up of the internal combustion engine, and wherein the step of determining a risk comprises determining a risk of excessive load on an associated starter.

24. A computer comprising a computer program for performing the steps of claim 20 when the program is run on the computer.

25. A non-transitory computer readable medium carrying a computer program for performing the steps of claim 20 when the program product is run on a computer.

26. A control unit for controlling the operation of a turbocompound unit, the control unit being configured to perform the steps of the method according to claim 20.

* * * * *